No. 614,979. Patented Nov. 29, 1898.
A. E. PRICE.
PNEUMATIC STRAW STACKER.
(Application filed Jan. 17, 1898.)
(No Model.)
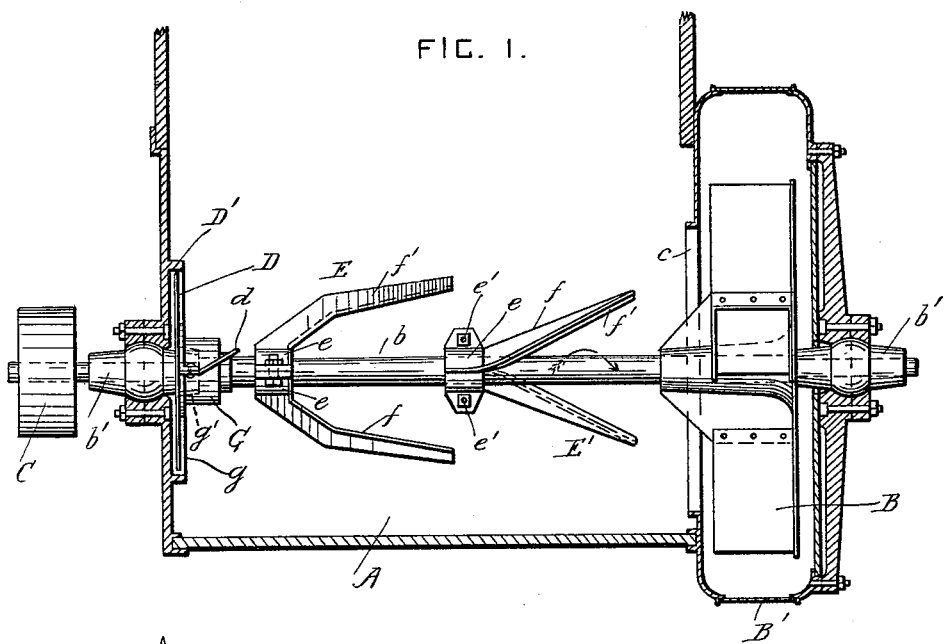
FIG. 1.
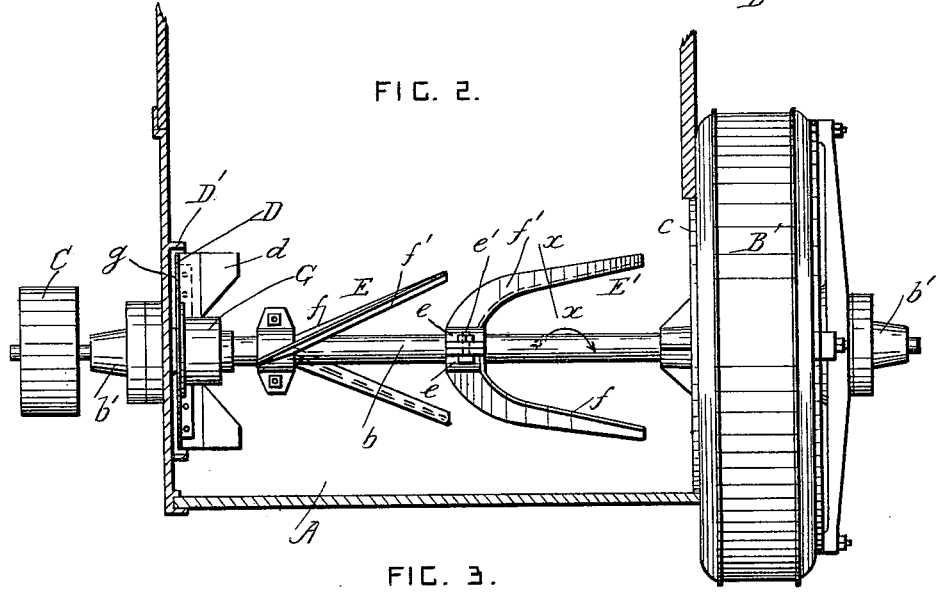
FIG. 2.
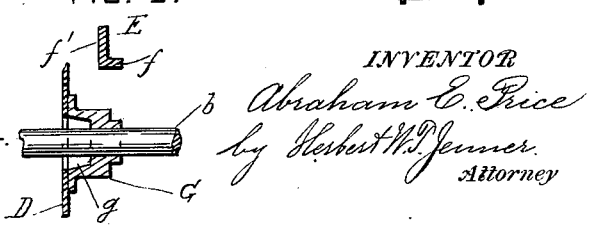
FIG. 3.
FIG. 4.
WITNESSES
J. O. Johnson
Chas A Ruru
INVENTOR
Abraham E. Price
by Herbert W. T. Jenner.
Attorney

UNITED STATES PATENT OFFICE.

ABRAHAM E. PRICE, OF WAYNESBOROUGH, PENNSYLVANIA, ASSIGNOR TO THE GEISER MANUFACTURING COMPANY, OF SAME PLACE.

PNEUMATIC STRAW-STACKER.

SPECIFICATION forming part of Letters Patent No. 614,979, dated November 29, 1898.

Application filed January 17, 1898. Serial No. 667,006. (No model.)

*To all whom it may concern:*

Be it known that I, ABRAHAM E. PRICE, a citizen of the United States, residing at Waynesborough, in the county of Franklin and State of Pennsylvania, have invented certain new and useful Improvements in Pneumatic Straw-Stackers; and I do hereby declare the following to be a full, clear, and exact description of the invention, such as will enable others skilled in the art to which it appertains to make and use the same.

This invention relates to pneumatic straw-stackers; and it consists in the novel construction and combination of the parts, hereinafter fully described and claimed, whereby the straw is fed to the discharger.

In the drawings, Figure 1 is a plan view showing the straw-chamber in section. Fig. 2 is an end view. Fig. 3 is a cross-section through one of the feed-arms, taken on the line $x\ x$ in Fig. 2. Fig. 4 is a longitudinal section through the hub G.

A is a straw-chamber at the rear end of a threshing-machine.

B is a centrifugal discharger mounted on a driving-shaft $b$, which extends transversely through the chamber A and is journaled in bearings $b'$. The bearings $b'$ are pivotally supported by the straw-chamber, so that they adapt themselves automatically to the shaft $b$.

B' is the discharger-casing, provided with a straw-inlet opening $c$.

C is the driving-pulley, secured on the shaft $b$, which is revolved in the direction of the arrow.

All of the above-mentioned parts are of any approved construction.

In order to prevent dust and dirt from getting into and around the bearing $b'$, which comes next to the driving-pulley, a disk D is secured on the shaft $b$ in close proximity to the side of the straw-chamber, but not in contact with it, and $d$ are fan-blades secured to the disk D. The fan-blades $d$ are preferably inclined rearwardly of the direction of their motion, as shown in Fig. 1, so as to assist in propelling the straw toward the discharger.

D' is a flange on the side of the straw-chamber, which forms a recess $g$ for the disk to run in. The flange D' encircles the disk D, but does not touch it. The fan-blades prevent dust from entering and accumulating in the recess $g$ between the disk and the side of the straw-chamber, and the space around the disk and the pivotally-supported bearing together permit the side of the chamber and the shaft $b$ to move slightly with respect to each other.

The disk D is secured to a hub G, which is secured to the shaft $b$ against the end of the bearing, and the hub G is provided with a recess $g'$, which incloses the end of the bearing.

E and E' are feed-arms secured on the shaft $b$ in pairs. Both pairs of arms are substantially alike; but the arms of the second pair are arranged intermediate of the arms of the first pair. Additional pairs of arms can be added, if desired.

Each feed-arm E has a half-hub $e$, and the two half-hubs of each pair of arms are clamped together on the shaft $b$ by means of bolts $e'$. Each arm E is attached at one end to its half-hub and projects longitudinally of the shaft $b$ toward the discharger, and is inclined or bent rearwardly of the direction of its motion, so that its face $f'$ may propel the straw toward the discharger. Each arm is preferably inclined outwardly at an acute angle away from the shaft; but the exact angle is immaterial and the arm may be made upon straight lines or upon curved lines, as desired, or upon both straight and curved lines, as shown at the right hand in the drawings.

Each arm is provided with a rib $f$ on the lower part of its rear side for the purpose of strengthening it, its face $f'$ being smooth, so that the straw may slide off it freely.

The hereinbefore-described feed mechanism is very effective in feeding the straw to the discharger and does not break the straw or become clogged by it.

What I claim is—

1. The combination, with a bearing, and a shaft journaled therein; of a disk secured on the shaft in proximity to the bearing, and fan-blades inclined rearwardly of the direction of their motion and projecting from the said disk, said blades operating to prevent dust from entering the bearing and to propel straw away from the disk, substantially as set forth.

2. The combination, with a straw-chamber having a recess, and a centrifugal discharger and its driving-shaft; of a disk secured on the said shaft and running in the said recess, and laterally-projecting blades which are carried by the said disk and which are inclined rearwardly of the direction of their motion and propel the straw toward the discharger, substantially as set forth.

3. The combination, with a straw-chamber having a bearing and a recess, of a shaft journaled in the said bearing, a hub secured to the said shaft and provided with a recess inclosing one end of the said bearing, and a disk secured to the said hub and running in the said recess in the straw-chamber, substantially as set forth.

4. The combination, with the driving-shaft of a centrifugal discharger; of a pair of feed-arms for propelling the straw toward the discharger, each said feed-arm being provided with a part of a hub at one end, a stiffening-rib upon its rear side also connected to the said hub, and a flat propelling-face at its middle and free end portions, said arm being rearwardly and outwardly inclined throughout its length; and means for securing the said parts of a hub together and thereby clamping the arms to the said shaft, substantially as set forth.

5. The combination, with the driving-shaft of a centrifugal discharger; of a feed-arm for propelling the straw toward the discharger, said feed-arm being provided at one end with a hub, which is secured to the said shaft, a stiffening-rib on its rear side also connected to the said hub, and a flat propelling-face at its middle and free end portions, said arm being rearwardly and outwardly inclined throughout its length, substantially as set forth.

In testimony whereof I affix my signature in presence of two witnesses.

ABRAHAM E. PRICE.

Witnesses:
GEO. H. RUSSELL,
ALF. N. RUSSELL.